(12) United States Patent  
Ochab et al.

(10) Patent No.: US 6,722,484 B2
(45) Date of Patent: Apr. 20, 2004

(54) BI-DIRECTIONAL OVERRUNNING CLUTCH FOR A PRIMARY DRIVE AXLE

(75) Inventors: David C. Ochab, Horseheads, NY (US); Kelly P. Heath, Corning, NY (US)

(73) Assignee: Hilliard Corporation, Elmira, NY (US)

( * ) Notice: Subject to any disclaimer, the term of this patent is extended or adjusted under 35 U.S.C. 154(b) by 0 days.

(21) Appl. No.: 10/253,357

(22) Filed: Sep. 24, 2002

(65) Prior Publication Data

US 2003/0089570 A1 May 15, 2003

Related U.S. Application Data

(60) Provisional application No. 60/333,609, filed on Nov. 14, 2001.

(51) Int. Cl.[7] ............................................. F16H 35/04
(52) U.S. Cl. .......................... 192/50; 492/35; 492/45; 492/48.92; 74/650
(58) Field of Search ................. 192/50, 48.92, 192/44, 45, 35; 74/650

(56) References Cited

U.S. PATENT DOCUMENTS

| 2,481,066 A | * | 9/1949 | Bagge ........................ 74/650 |
| 3,124,972 A | | 3/1964 | Seliger et al. |
| 3,173,309 A | * | 3/1965 | Seliger ...................... 74/650 |
| 3,310,997 A | * | 3/1967 | Biddler ...................... 74/650 |
| 3,447,396 A | | 6/1969 | Seliger |
| 3,581,597 A | | 6/1971 | Reiersgaard |
| 3,700,082 A | | 10/1972 | Schwab |
| 3,732,750 A | | 5/1973 | Posh |
| 3,935,753 A | | 2/1976 | Williams |
| 4,373,407 A | | 2/1983 | Okubo |
| 4,434,878 A | * | 3/1984 | Okubo ..................... 192/48.92 |
| 4,876,918 A | * | 10/1989 | Hudson ........................ 74/650 |
| 5,036,939 A | | 8/1991 | Johnson et al. |
| 5,203,232 A | | 4/1993 | Ito et al. |
| 5,971,123 A | | 10/1999 | Ochab et al. |

FOREIGN PATENT DOCUMENTS

| DE | 430321 | 6/1926 |
| JP | 59-86747 | 5/1984 |

* cited by examiner

Primary Examiner—Saul Rodriguez
(74) Attorney, Agent, or Firm—Drinker Biddle & Reath LLP

(57) ABSTRACT

A bi-directional overrunning clutch for transmitting torque to segments of a primary drive axle. The clutch includes an input gear, a clutch housing, and hubs extending out of the housing that attach to the segments. A roll cage is located within the housing and has rollers arranged in two sets, each set located adjacent to a hub. The rollers wedge between the hubs and first tapered portions on the clutch housing when the roll cage is rotated in a first direction relative to the housing (forward-engagement position), and between the hubs and second tapered portions on the clutch housing when the roll cage is rotated in a second direction relative to the housing. A friction member contacts the roll cage to engage the roll cage to the hub to wedge the rolls between the hubs and the clutch housing.

30 Claims, 12 Drawing Sheets

TURNING LEFT

TURNING RIGHT

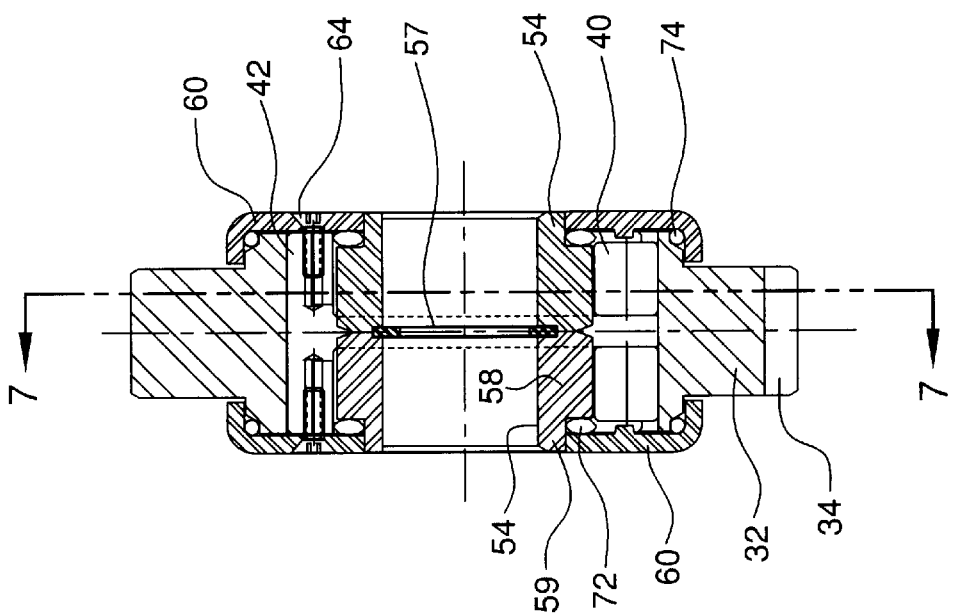

BI-DIRECTIONAL OVERRUNNING CLUTCH FOR A PRIMARY DRIVE AXLE

RELATED APPLICATION

The present invention is related to and claims priority from U.S. Provisional Application entitled "Bi-Directional Overrunning Clutch for a Primary Drive Axle", filed Nov. 14, 2001, Ser. No. 60/333,609, which is incorporated herein by reference in its entirety.

FIELD OF THE INVENTION

The present invention is directed to clutches and, more particularly, to a bi-directional overrunning clutch for controlling torque transmission to the primary drive shaft of a wheeled machine.

BACKGROUND OF THE INVENTION

In recent years there has been a tremendous demand for adding motor propulsion to what had previously been manual propelled machines. One example of such a device is walk-behind power equipment. These devices were once solely push-propelled. However, recently most models have become self-propelled. Examples of such equipment are lawnmowers, lawn vacuums, snowblowers, trimmers, edgers, concrete and asphalt cutters and the like. A number of factors have driven the move to self-propulsion, such as a desire for larger equipment which require less effort and allow for more detailed control. Speed of operation is another factor that has driven the increase demand for self-propelled equipment. Current self-propulsion systems for walk-behind equipment generally fall into two categories, simple and complex.

In a simple type drive system, a drive shaft or belt is connected to a single drive axle which drives both wheels. Since the wheels ware on a common shaft, they rotate at the same rate. The principal deficiency with this type of device is that no differential rotation is permitted between the drive wheels. As a result, the machine is not efficient during cornering which requires the outer wheel to travel a greater distance than the inner wheel. Because the outer wheel must travel farther than the inner wheel in the same amount of time, the outer wheel must rotate faster than the inner wheel. When the outer and inner wheels are fixed to a common axle, however, this differential rotation is not permitted. The result is that either the inner wheel is driven faster or the outer wheel is driven slower than necessary. In either case, cornering the equipment requires one of the wheels to slip or skid. This results in premature wear of the wheel.

Difficulty with cornering and wheel slippage are two major disadvantages with using equipment having drive wheels fixed to a common axle. Additionally, effort by the operator must be provided to overcome the ground-engaging forces to allow one wheel to slip. Furthermore, wheel slippage can cause damage to the surfaces on which the equipment is operating, as well as accelerated tire wear. For instance, turning a lawnmower with this type of drive system damages the turf under the slipping wheel.

One solution to this problem is described in U.S. Pat. No. 6,209,697 which describes a one directional overrunning clutch which is mounted in the hub of a wheel of a conventional walk-behind device, such as a lawnmower.

Complex drive systems for self-propelled, walk-behind power equipment generally provide a differential between the pair of drive wheels. The differential permits independent or differential rotation of the drive wheels on an axle when the user corners.

Many differentials on the market today use some form of an overrunning clutch to transmit torque when needed to a driven shaft. One successful use of an overrunning clutch in an all terrain vehicle is disclosed in U.S. Pat. No. 5,036,939. In that patent, the vehicle incorporates overrunning clutches where the wheel hub mounts to the axle, thus allowing each wheel to independently disengage when required.

Another successful use of an overrunning clutch in a differential is disclosed in U.S. Pat. No. 5,971,123, commonly owned by the assignee of the present invention. That patent describes an innovative electromechanical bi-directional overrunning clutch differential which addressed many of the problems inherent in the prior drive systems. The bi-directional overrunning clutch differential utilized an electrically controlled coil to advance and/or retard a roll cage, thereby controlling the ability of the differential to engage and disengage depending on the operational state of the primary and secondary wheels. The bi-directional differential in U.S. Pat. No. 5,971,123 also describes a backdrive system. The backdrive system actively engages the secondary shafts in certain situations where extra traction is needed. For example, when the vehicle is driving down a slope the system engages the front wheels, which are the wheels with the better traction.

Conventional complex differentials and overrunning clutches are generally costly to manufacture and, thus, relegated to more expensive vehicles, such as cars and four wheel drive vehicles.

A need exists for a less complex and less expensive bi-directional overrunning clutch that can be used in various self-propelled machines and light duty vehicles, such as snowblowers, lawn mowers, golf carts, and concrete and asphalt cutters.

SUMMARY OF THE INVENTION

According to the present invention there is provided an overrunning clutch for controlling torque transmission to a pair of shaft segments of a primary drive axle in a wheeled machine. The overrunning clutch includes a pair of hubs each engaged with an interior end of a corresponding shaft segment of the primary drive axle. The overrunning clutch further includes a roller assembly having rollers arranged in two sets, each associated with one of the hubs, and a roll cage having a plurality of recesses, each recess including at least one roller. The roll cage defines a central opening in which the pair of hubs is received. The overrunning clutch also includes a cam surface which is located radially outward from the roller assembly. The cam surface, acting in conjunction with the hubs, is adapted to provide wedging engagement of the rollers between the cam surface and the hubs when the roll cage is rotated relative to the clutch housing (forward-engagement position). The overrunning clutch further includes at least one friction member which is in contact with the roll cage and the hub such that, during operation, the friction member generates friction forces between the roll cage and the hub which cause the roll cage to turn with the hub, thus placing the roll cage in the forward-engagement position.

According to one embodiment of the invention, the overrunning clutch includes a pair of covers mounted on opposite sides of the roll cage for concomitant rotation therewith. In this embodiment, the friction member includes a pair of elastic frictional members, such as O-rings, one mounted in compression between each hub and an adjacent cover such that the elastic member causes the roll cage to turn in combination with the hub. In another embodiment of the invention, the friction member is a wave spring located between the roll cage and the hub.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

FIG. 5 is a side view of the bi-directional overrunning clutch of FIG. 4;

FIG. 6 is a cross-sectional view of the clutch taken along section lines A—A in FIG. 7;

DETAILED DESCRIPTION OF THE EMBODIMENTS

Figure 1A:
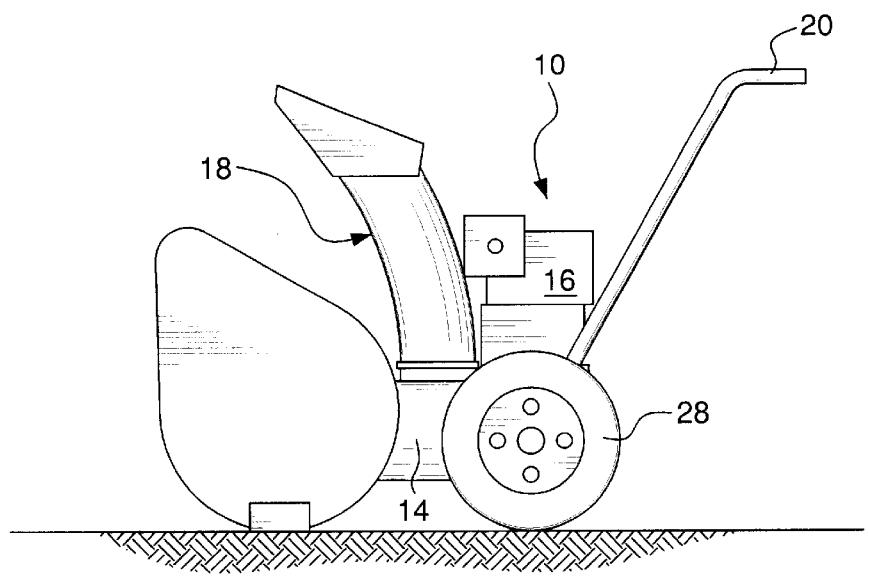
FIG. 1A is a side view of a snowblower incorporating the present invention.
Figure 1B:
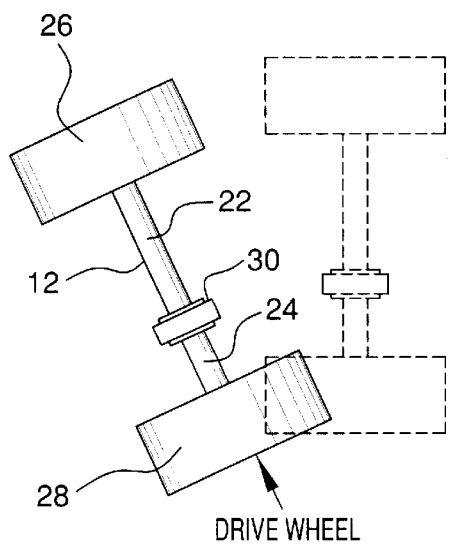
FIG. 1B is a schematic illustration of the wheels, axle and clutch of the snowblower of FIG. 1A turning left.
Figure 1C:
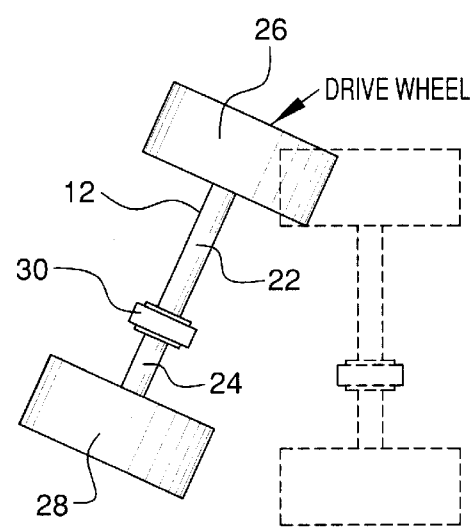
FIG. 1C is a schematic illustration of the wheels, axle and clutch of the snowblower of FIG. 1A turning right.

Referring now to the drawings, wherein like reference numerals illustrate corresponding or similar elements throughout the several views, FIGS. 1A–1C illustrate a snowblower 10 which incorporates a bi-directional overrunning clutch according to the present invention. The snowblower includes a drive axle 12 that is supported for rotation with respect to a frame 14 in a conventional manner. A motor 16 provides the power for a blower assembly 18 as well as power for propelling the snowblower 10 as will be described in greater detail. A handle 20 is connected to the frame 14 to provide for walk-behind operation of the snowblower.

Figure 2:
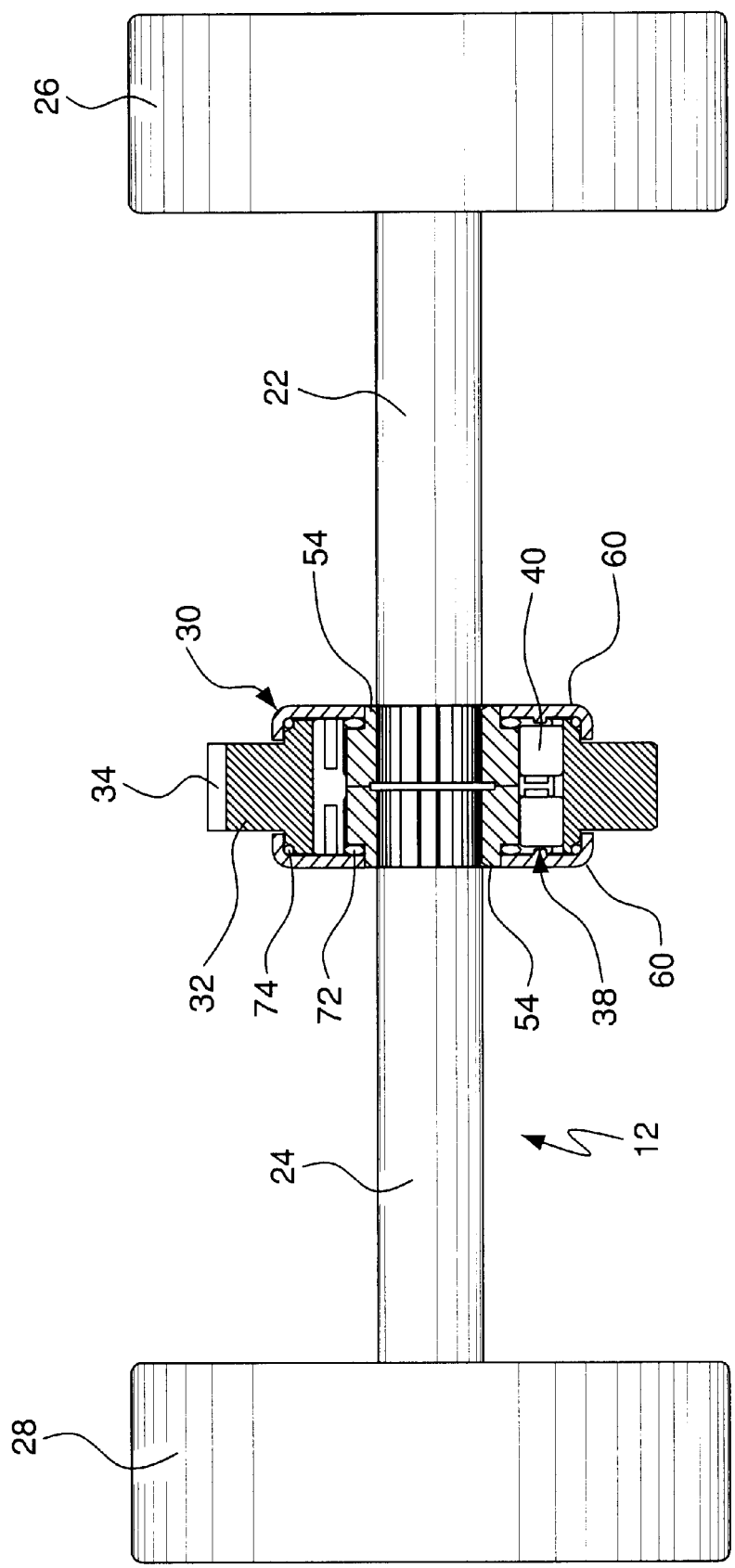
FIG. 2 is a schematic illustration of one embodiment of the overrunning clutch according to the present invention for use in a positive drive machine such as the snowblower of FIG. 1A.

As seen in FIG. 2, the drive axle 12 includes separate shaft segments 22, 24 that are connected to wheels 26, 28, respectively, for rotation therewith. Each of the shaft segments 22, 24 is also connected at an opposite interior end to a bi-directional overrunning clutch 30 that is engageable to the motor 16. The connection can be through any conventional means, but in the illustrated embodiment is a splined connection.

The bi-directional overrunning clutch 30 is constructed to transfer torque to the shaft segments 22, 24 for driving the wheels 26, 28. As will be described in greater detail, the construction of the clutch 30 facilitates turning of the snowblower 10 by allowing an outer wheel and the associated shaft segment to rotate faster than the inner wheel and associated shaft segment which remain positively driven by the clutch 30. Thus, the clutch 30 permits the outer wheel to independently rotate while the inner wheel continues to drive the machine. The drive axle 12 and wheels 26, 28 are shown in dashed line in FIGS. 1B and 1C being driven along a straight path to the left and in solid line being driven though turns. In the left turn illustrated in FIG. 1B, wheel 26 is allowed to overrun clutch 30 while wheel 28 remains a positively driven wheel. In the right turn shown in FIG. 1C, wheel 28 overruns while wheel 26 is positively driven by clutch 30.

Figure 3:
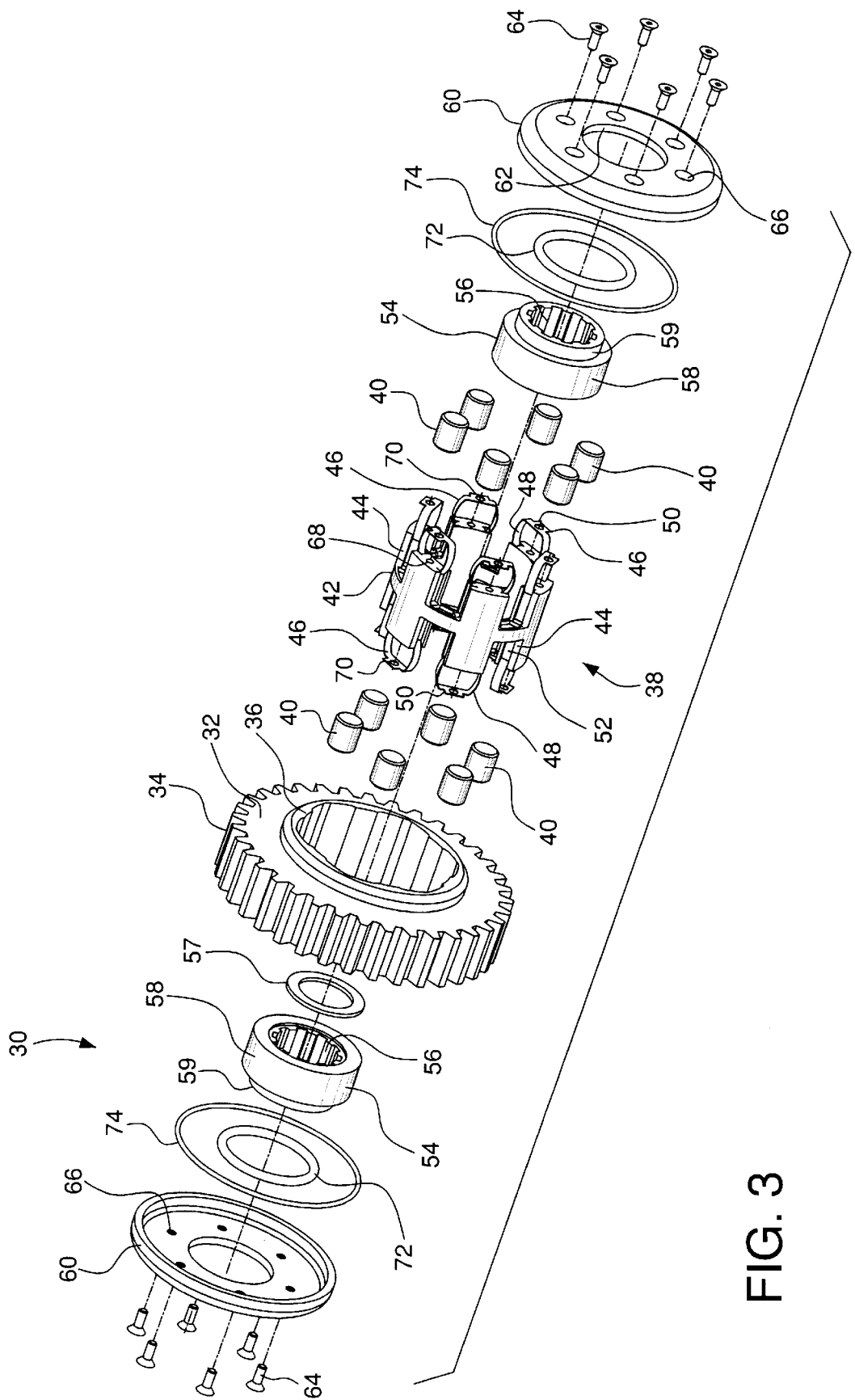
FIG. 3 is an exploded perspective of a bi-directional overrunning clutch according to one embodiment of the present invention.

Referring to FIG. 3, the construction of the bi-directional clutch 30 according to the present invention is illustrated in an exploded perspective view. The clutch 30 includes a clutch housing 32 having gear teeth 34 integrally formed about an outer surface thereof. As will be well understood by one skilled in the art, the gear teeth 34 are adapted to engage cooperatively formed teeth of a motor-driven gear (not shown) for transmitting rotation from a drive shaft to the clutch housing 32. Also, while the gear teeth are shown as being formed integral with the clutch housing, it should be readily apparent that the gear teeth 34 may be formed on a separate component that is attached to the clutch housing 32.

The clutch housing 32 includes an inner cam surface 36 for transferring rotation of the clutch housing 32 to other components of the clutch 30 as will be described in greater detail below.

The clutch 30 further includes a roller assembly 38 having rollers 40 arranged in two sets, preferably of six rollers each, although other number of rollers can be used in the present invention. The roller assembly 38 also includes a roll cage 42 for rotatably supporting the rollers 40. The roll cage 42 includes spaced slots or recesses 44 formed on opposite sides of the cage 42. The slots 44 are sized to receive the rollers 40.

The roller assembly 38 includes a plurality of spring clips 46 for positioning the rollers 40 in the slots 44. Each of the clips 46 is preferably substantially C-shaped with a base portion 50 and two outwardly curving arms 48 extending from opposite ends of the base portion 50. As seen in FIG. 3, the arms 48 for each of the clips 46 are received in adjacent slots 44 with the base portion 50 positioned against the lateral face of the roll cage 42. Channels 52 are preferably formed in the slots 44 and sized to receive the ends of the arms 48 opposite the base portion 50 for guiding and retaining the arms in the slots. The curvature of the arms 48 is such that they curve inward into the slots 44 and operate to position the rollers 40 within the roll cage 42. More specifically, as shown, one arm from each adjacent spring clip 46 is located within each slot. The arcade shape of each arm curve toward one another, thus biasing the roller substantially into the center of the slot, which is the neutral position of the roller. The base portion of the spring clip 46 preferably includes a hole which receives a fastener, such as a screw for mounting the spring clip 46 to the roll cage. The springs account for tolerances in the manufacturing of the various components so that the rollers all engage at the same time.

While the figures illustrate the use of the C-shaped spring clips 46 described above for positioning the rollers, other springs can be substituted into the roller assembly. For example, a suitable spring clip is described in co-pending application Ser. No. 09/803,059, filed Mar. 9, 2001 and titled "Spring Assembly For A Bi-Directional Overrunning Clutch" which is commonly owned by the assignee of the present invention. That application is incorporated herein by reference in its entirety.

Figure 7:
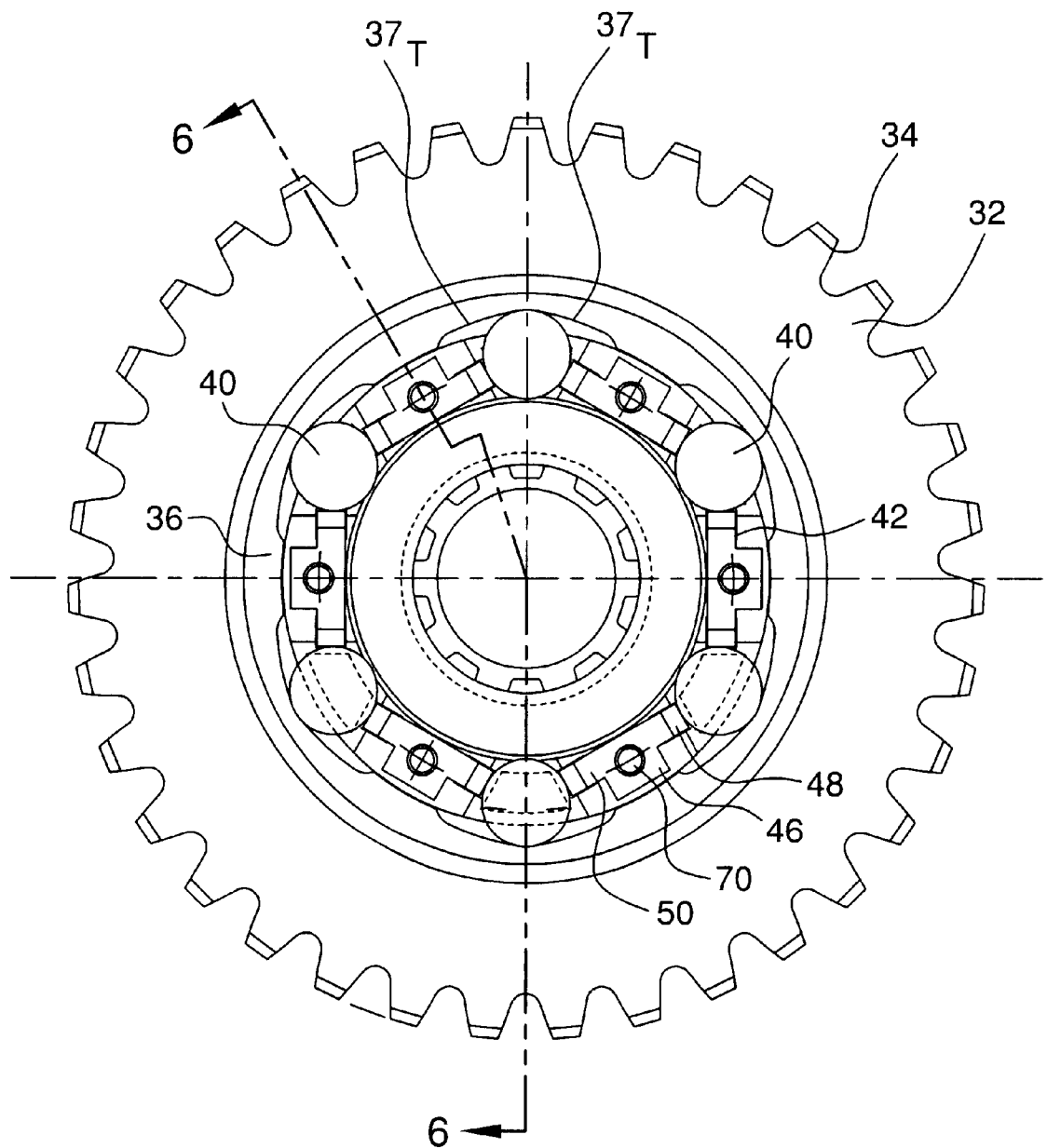
FIG. 7 is a side cross-sectional view of the clutch taken along lines B—B in FIG. 6.
Figure 8:
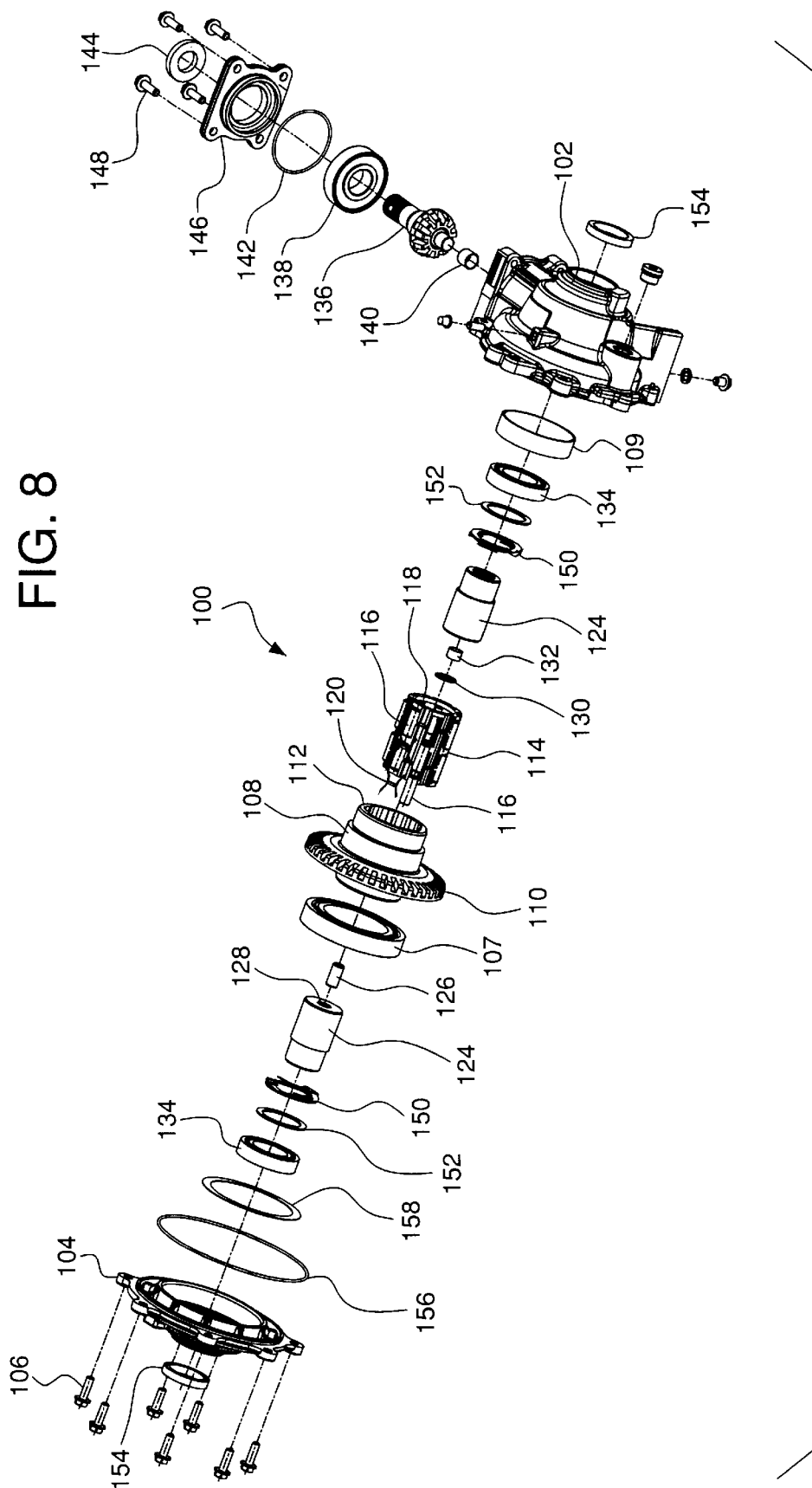
FIG. 8 is an exploded perspective view of another embodiment of a bi-directional overrunning clutch according to the present invention.

The clutch 30 further includes hubs 54 having splines 56 formed on an inner surface thereof for receiving splined ends of the shaft segments 22, 24. Of course, the hub may instead include a stub shaft portion with outer splines for engaging with inner splines on a shaft segment. Other types of well known connections can be substituted for the illustrated splines. The splined connection secures the hubs 54 to the shaft segments 22, 24 such that each of the hubs 54 rotates in combination with one of the shaft segments 22, 24. As best seen in FIGS. 6 and 7, for example, the hubs 54 are received within the interior of the roll cage 42 such that rollers 40 are located between the outer surface of the hubs 54 and the inner cam surface 36. A washer or bearing 57 is located between the hubs 54 to facilitate relative rotation between the two hubs 54 during the turning of the snowblower 10 shown in FIGS. 1B and 1C. The washer 57 can be made of any suitable low friction material or may be a roller or thrust bearing. Other types of components can also be used.

Figure 4:
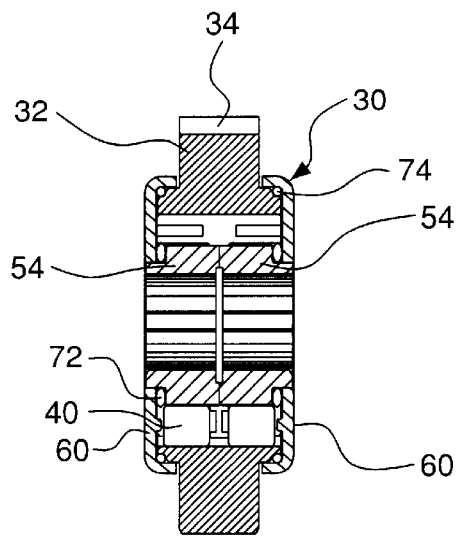
FIG. 4 is a cross-sectional view of the bi-directional overrunning clutch of FIG. 3.

Referring again to FIG. 3, each of the hubs 54 includes a first roller engaging portion 58 and a second portion 59 having an outer surface that is preferably reduced in diameter with respect to that of the roller engaging portion 58. The reduced diameter portion 59 is preferably sized to extend through a central opening 62 in one of opposite covers 60. The mounting of the hubs 54 and covers 60 to the clutch housing 60 is seen in FIGS. 4 and 6. A plurality of bolts 64 extend through openings 66 in the covers 60 and thread into openings 68 in the roll cage 42 for securing the covers 60 to the roll cage as seen in FIG. 7. As seen in FIG. 3, each of the spring clips 46 also includes an opening 70 in the base portion 50. When the spring clips 46 are engaged with the roll cage, the openings 70 in the base portion 50 aligned with the threaded holes 68 in the roll cage 42. Thus, the attachment of the cover 60 to the roll cage 42 also secures the clips 46 to the roll cage 42.

In the embodiment of the invention shown in FIGS. 3–7, the bi-directional overrunning clutch 30 also includes inner and outer O-rings, 72, 74, respectively, which provide a grease seal for the roller assembly 38. As seen in FIGS. 2, 3, and 6, the inner O-rings 72 are located between the radially inner side of the roll cage 42, the covers 60 and the hubs 54. The outer O-rings 74 are located between an outer edge of the clutch housing 32 and the cover 60. As will be described in greater detail, the inner O-rings 72 also operate as a frictional members to assist in controlling torque transfer between the clutch housing 32 and the shaft segments 22, 24 as will be described in greater detail. As will become apparent, the friction components need not be O-rings, but may be elastic components or springs.

Referring to FIGS. 4, 4A, 4B and 6, the bi-directional overrunning clutch 30 operation will now be described in more detail. Although the drawings illustrate the incorporation of the bi-directional overrunning clutch in a walk-behind single axle snowblower 10, it will become quite apparent from the following discussion that the present invention is not limited to use with only a snowblower. Instead, the present invention can be used with any suitable machine that has a primary drive axle with two shaft segments that are driven. As described above, the covers 60 and roll cage 42 are secured together by the bolts 64. In so doing, the inner O-rings 72 are compressed between the covers 60 and the hubs 54 is shown in FIG. 6. The frictional forces generated by the compression of the O-rings 72 (or similar elastic member) provides limited restraint against relative motion between the roll cage 42/covers 60 combination and the hubs 54.

Figure 4A:
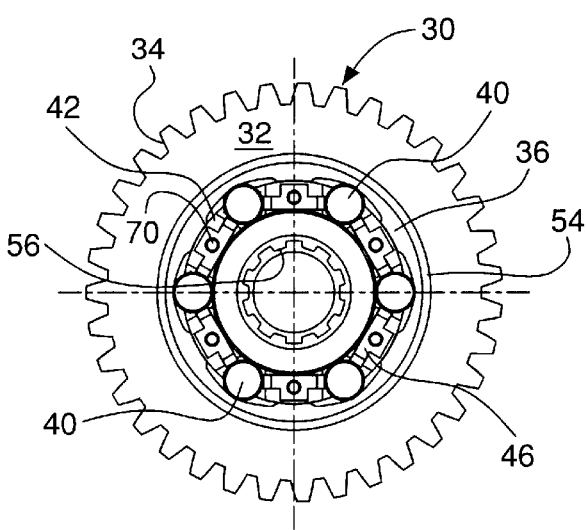
FIG. 4A is a side view of the bi-directional overrunning clutch of FIG. 4 in its neutral position.

FIG. 4A illustrates the bi-directional overrunning clutch prior to engagement. As shown, the rollers 40 of the roller assembly 38 are located between forward and reverse portions of the cam surface 36. More specifically, as shown in FIGS. 4A and 7, the contour of cam surface 36 includes a plurality of peaks and valleys. When the roll cage 42 is located within the clutch housing 32, the rollers 40 are located within the valleys with the cam surface 36 tapering inward toward the roll cage on either side of the rollers 40 (generally referred to herein as tapered portions $37_T$). The cam surface 36, hub 54 and rollers 40 provide the bi-directional overrunning capabilities as will be discussed hereinafter. Cam surfaces and roll cages in overrunning clutches are well known in the art. See, e.g., U.S. Pat. Nos. 4,373,407 and 5,971,123 which are incorporated herein by reference in their entirety. As such, a detailed discussion of the features of a cam surface is not needed.

In the position shown in FIG. 4A, the hub 54 is not engaged to the clutch housing 32 since the rollers 40 are not wedged between the clutch housing 32 and the hub 54. However, in the present invention, the friction member, which in the illustrated embodiment is the inner O-rings 72, provides frictional connection between the roll cage 42 and the hubs 24 causing the roll cage 42 to move with the hubs 54. As such, any relative motion between the clutch housing 32 and the hub 54 will cause the roll cage 42 to index or position the rollers 40 for engagement. Hence, although the position of the rollers shown in FIG. 4A theoretically provides no direct torque transfer between the input gear 34 and the hub, in reality, positive drive occurs essentially instantaneously upon engagement. For example, in the embodiment illustrated, engagement occurs with as little as 8 degrees of rotation.

Figure 4B:
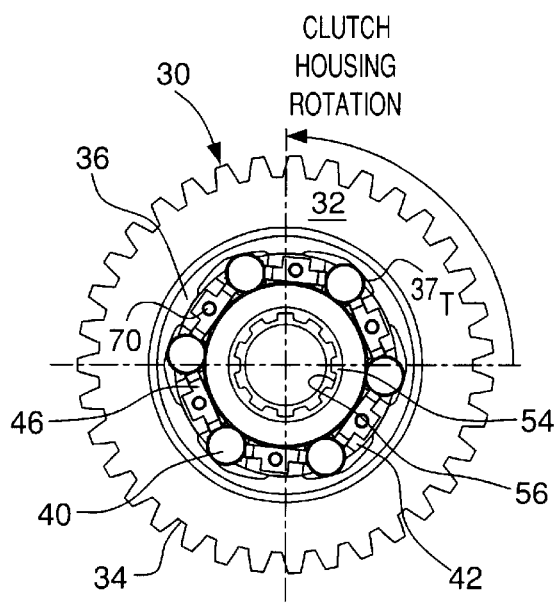
FIG. 4B is a side view of the bi-directional overrunning clutch of FIG. 4 in its positive drive engagement position.

Referring now to FIG. 4B, the bi-directional clutch 30 is shown with the roller assembly in its forward-engagement position. As discussed above, when the drive system of the snowblower 10 is engaged for forwardly driving the snowblower, the clutch housing 32 will rotate with respect to the frame 14 of the snowblower 10. Since the hubs 54 are engaged to the wheels 26, 28 through the shaft segments 22, 24, the hubs initially do not move. However, the frictional forces generated by the inner O-rings 72 between the covers 60 and the hubs 54 cause the roll cage 42 to rotate with the hubs 54. As a result, the rollers 40 wedge between the forward tapered portions $37_T$ of the cam surface 36 and the hub 54. The wedging of the rollers 40 provides a path for the transmission of torque from the input gear through the rollers 40 to the hub 54. This represents the forward-engagement position of the bi-directional clutch which permits the motor-driven rotation of the hubs 54 and the associated shaft segments 22, 24 and wheels 26, 28.

The above-described construction of the bi-directional clutch 30, however, also allows the shaft segments 22, 24 to separately overrun (disengage) from the forward-engagement position. This is particularly important during turning where it is beneficial to permit one wheel (i.e., the outer wheel) to turn faster than the other wheel (i.e., the inner wheel). This prevents scuffing and resultant wear of the slower moving wheel. More importantly, the overrunning greatly reduces the effort required to steer the vehicle. The present invention achieves this goal in the primary drive axle by allowing each hub 54 to overrun separately, i.e. to rotate independent from the clutch housing 32, when the hub 54 rotates faster than the clutch housing 32. As described above, the frictional force generated by the O-rings 72 between the covers 60 and the hubs 54 operates to restrain relative rotation between the roll cage 42 and the hubs 54. Such restraint, while beneficial for establishing the wedging engagement of the roller assembly 38, will also tend to restrain the hubs 54 against relative rotation with respect to the roll cage 42 when overrunning of the clutch by the shaft segments 22, 24 is desired for turning. The frictional force, however, is limited. In particular, the O-rings 72 are designed to provide sufficient friction to engage the roll cage 42, but which is readily overcome by the rotation of the hub 54 relative to the clutch housing 32.

The overrunning condition of the clutch 30 during the turning of the snowblower 10 is illustrated in FIGS. 1B. As described previously, in the forward-engagement position shown in FIG. 4B, the rollers 40 are wedged between the forward tapered portions $37_T$ of the cam surfaces 36 and the roller engaging portions 58 (FIG. 3) of the hubs 54. When the snowblower 10 is directed into a left turn in the forward driven mode as shown in FIG. 1B, the frictional forces from the O-ring 72 associated with the hub engaged with shaft segment 22 will be overcome by that hub turning faster than the clutch housing 32. The hub 54 and the associated shaft segment 22 will overrun the clutch, preventing the rollers 40 on that side of the roll cage 42 from wedging with the tapered portion $37_T$. The disengagement of the rollers 40 allows the outer wheel 26 to rotate faster than the inner wheel 28. Also, since the rollers 40 are not wedged on that side of the clutch, there is no torque transfer from the clutch housing 32 to the outer wheel 26. However, the inner wheel 28 and the shaft segment 24 and hub 54 associated with it remain driven by the clutch during the turn shown in FIG. 1B (i.e., the rollers on the inner side remain engaged.) As such, the hub 54 on the inner wheel rotates with the roll cage 42. Upon reentering a straight path following the turn, the rotational speed of the overrunning shaft segment will equalize with the rotational speed of the driven shaft segment and the clutch housing 32. The equalization of the relative speeds causes the rollers 40 to once again wedge between the clutch housing 32 and the hubs 54 in the forward-engagement position whereupon both axles are driven by the input gear.

Referring to FIG. 7, the cam surface 36 includes reverse-engagement surfaces which are the tapered portions $37_T$ opposite the forward-engagement surfaces associated with the forward-engagement position shown in FIG. 4B. As such, the clutch is bidirectional, permitting it to be reversibly driven. For example, if the snow blower in the illustrated embodiment was designed with a reverse gear, upon shifting to reverse, the input gear would turn the opposite way from the illustrated embodiment of FIG. 4B. Thus, the rollers would engage with the tapered portions $37_T$ associated with the reverse-engagement position. The bi-directional clutch according to the present invention permits torque transfer (driving) in such a reverse direction. Furthermore, as with the forward driving of the vehicle, the present invention also permits overrunning in the reverse direction.

Figure 4C:
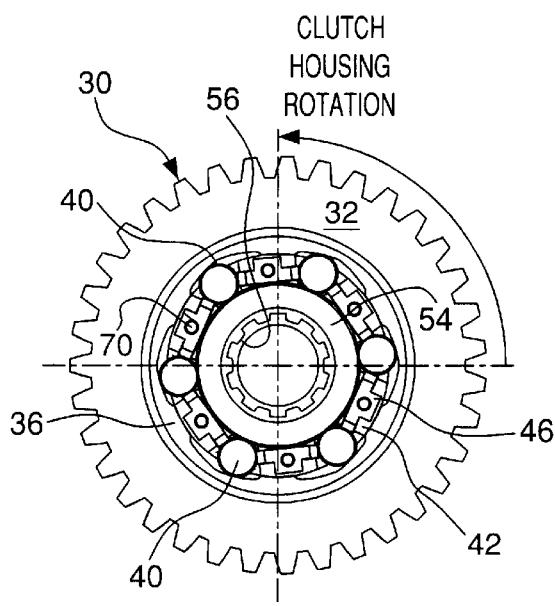
FIG. 4C is a side view of the bi-directional overrunning clutch of FIG. 4 in its backdrive engagement position.

Another aspect of the bi-directional clutch according to the present embodiment is that it permits backdriving, which has particular importance in situations where it is necessary or desirable to prevent the wheels from rotating faster than the input gear. For example, when the machine is being operated on a descending slope. The speed of the wheels tends to go faster than the speed of the input gear. In a single direction overrunning clutch, the wheels would overrun and the machine would be free-wheeling (uncontrolled). To limit the speed of the wheels, the present invention uses the reverse-engagement position to engage the wheels with the input gear. As the wheels 26, 28 overrun the clutch 30, the frictional forces generated by the inner O-ring 72 will cause the roll cage 42 to advance with respect to the inner cam surface 36. The shifting of the roll cage 42 causes the rollers 40 to engage the tapered portions $37_T$ of the cam surface 36 opposite from the tapered portions $37_T$ in the forward-engagement position. This is shown in FIG. 4C and corresponds to the reverse-engagement position of the clutch. The wedging of the rollers 40 between the inner cam surface 36 and the hubs 54 prevents the wheels 26, 28 from overrunning the clutch housing 32. The shift of the roll cage 42 to the reverse-engagement clutch position therefore provides for controlled operation of the snowblower 10 on a descending slope, forcing the wheels 26, 28 to rotate at the same relative speed as the rotational speed of the clutch housing 32/input gear.

The embodiment shown in FIGS. 2–7 is a compact design which would work well in conventional two-wheel drive walk behind and light duty machines and vehicles where overrunning is needed on the primary drive axle. The invention, however, is also equally applicable for providing positive drive for heavy duty machines and vehicles, such as 2 and 4 wheel drive vehicles. Referring to FIGS. 8–11, there is shown a bi-directional overrunning clutch 100 according to a second embodiment of the present invention. Although the clutch 100 is constructed for a larger application, such as a golf cart, the clutch 100 functions analogously to the overrunning clutch 30 described above as will become apparent from the following discussion.

The clutch 100 includes a main housing 102 and a cover 104 that is secured to the main housing by bolts 106. The clutch 100 further includes a clutch housing 108 that is mounted within the main housing 102. A bearing 107 and a bushing 109 are located between the main housing 102 and the clutch housing 109 to facilitate rotation of the clutch housing 108 within the main housing 102. The clutch housing 108 includes a ring gear 110 preferably integrally formed on an outside surface and a inner cam surface 112 preferably integrally formed on an opposite inner surface. The clutch 100 includes a roller assembly 114 having rollers 116 arranged in two sets of preferably seven rollers. Although seven rollers are preferred, any number of rollers cam be used depending on the design of the clutch. The roller assembly 114 also includes a roll cage 118 with slots within which the rollers 116 are located. The roller assembly 114 also includes a plurality of generally H-shaped clips 120 having outwardly curving arms 122 for biased support of the rollers 116 within the roll cage 118. A detailed description of a suitable roller assembly for use in this embodiment can be found in co-pending application Ser. No. 09/802,608, filed Mar. 9, 2001 and titled "Bi-Directional Overrunning Clutch With Automatic Backdrive." That application is incorporated herein by reference in its entirety.

The clutch 100 further includes a pair of hubs 124 each having splines formed at one end on an inner surface thereof for receiving a splined end of a shaft segment of a driven axle (not shown). The roll cage 118 and hubs 124 are received within the clutch housing 108 such that the roll cage is positioned between the inner cam surface 112 and outer surfaces of the hubs 124. A dowel 126 is received in an opening 128 in the center of each of the hubs 124 opposite the splined end. Relative rotation between the hubs 124 is also facilitated by a needle roller thrust bearing 130 located between the hubs 124 and a bushing 132 received by the dowel 126. Each of the hubs is rotatably supported within the main housing 102 by a bearing 134.

The clutch 100 includes a pinion gear 136 adapted to engage the ring gear 110 of clutch housing 108 for transmitting rotation of the pinion gear 136 into rotation of the clutch housing 108. As well understood by one skilled in the art, the pinion gear is connectable to a motor drive train (not shown) for rotation of the pinion gear 136 by the motor drive train. The clutch 100 includes a bearing 138 and bushing 140 to provide for rotational support of the pinion gear 136 within the main housing 102. An O-ring 142, seal 144 and a pinion gear cover 146 secured to the main housing 102 by bolts 148 provides for sealed enclosure of the pinion gear 136 within the main housing 102.

Relative rotation between the roll cage 118 and the clutch housing 108 is provided by wave springs 150 and washers 152. A wave spring 150 and a washer 152 is positioned between each of the opposite ends of the roll cage 118 and one of the bearings 134 which provides rotational support of one of the hubs 124. An oil seal 154 is received by each hub 124 at an end thereof. An O-ring 156 provides a seal for cover 104. The clutch 100 also includes a positioning shim 158 that is located between the clutch housing bearing 107 and the cover 104.

Figure 9:
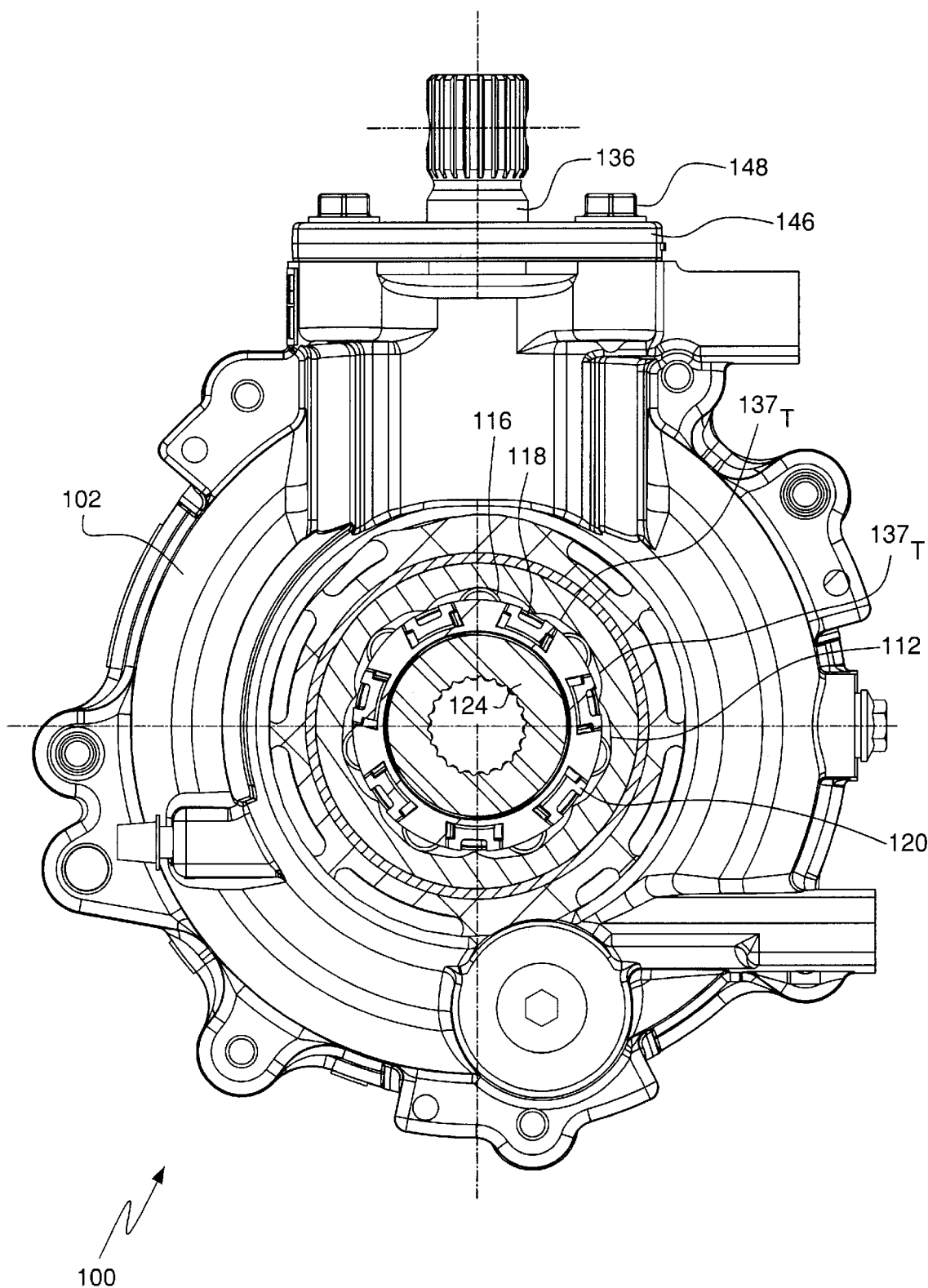
FIG. 9 is a right side, partial sectional view of the bi-directional overrunning clutch of FIG. 8.
Figure 10:
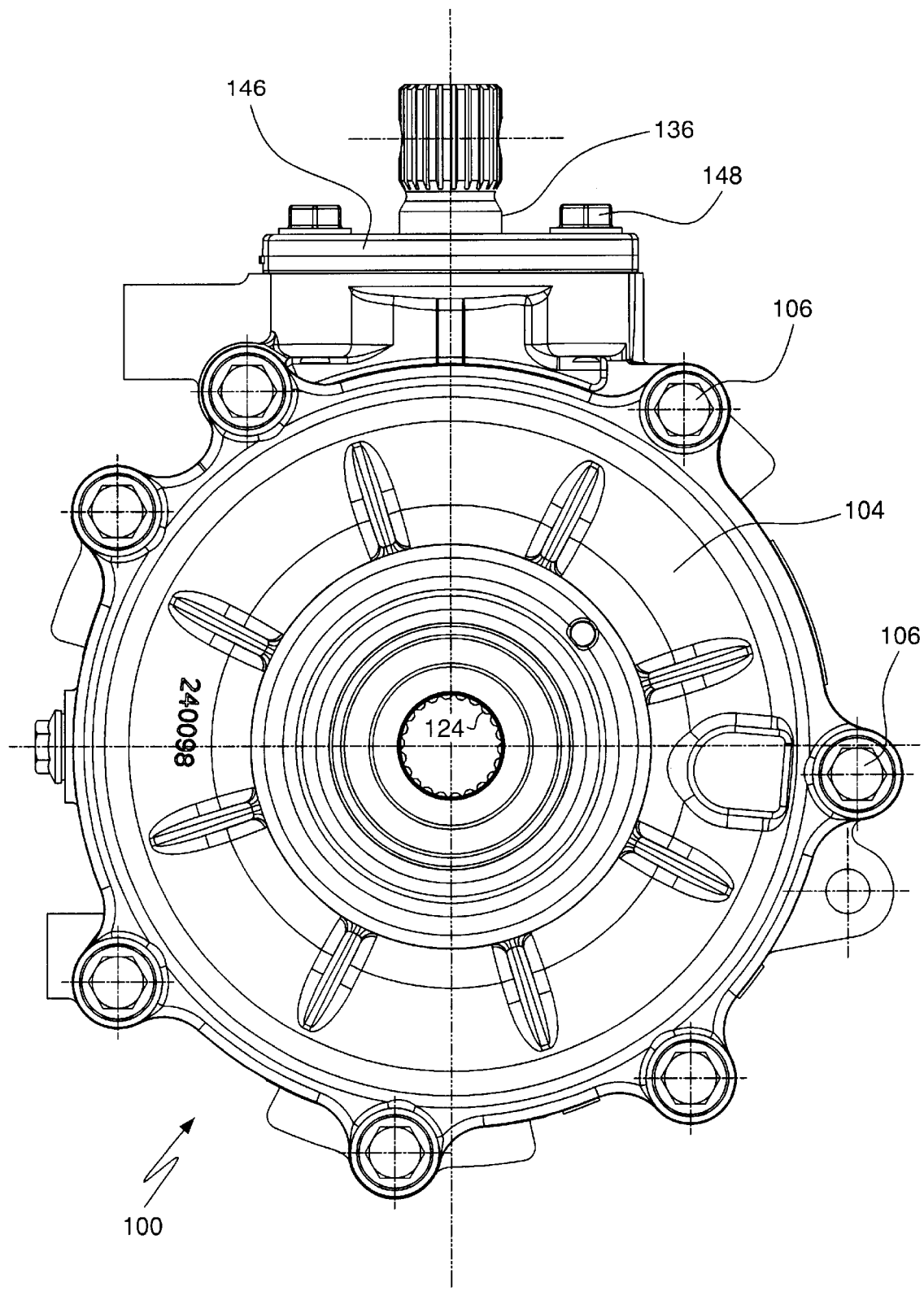
FIG. 10 is a left side view of the bi-directional overrunning clutch of FIG. 8.
Figure 11:
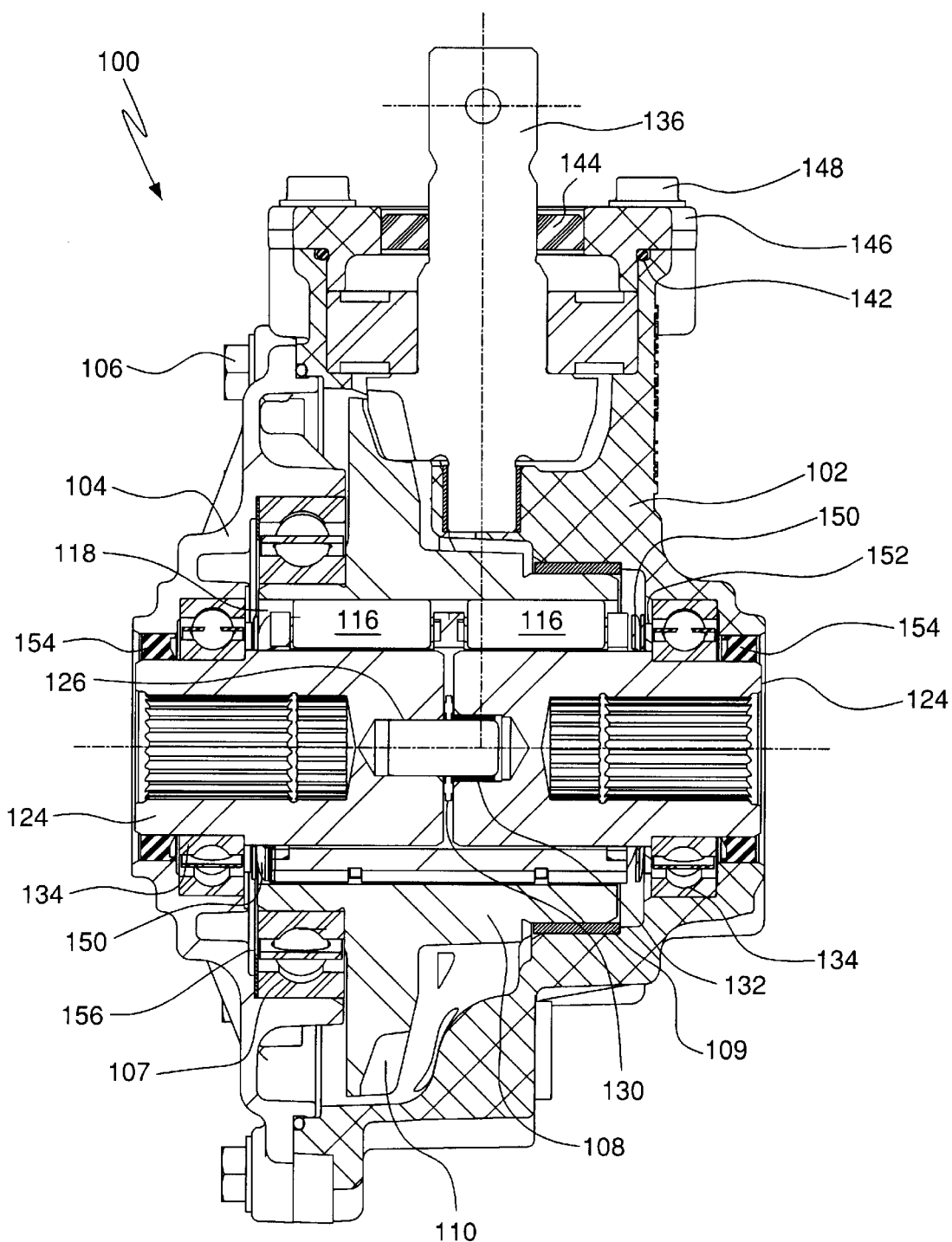
FIG. 11 is a cross-sectional view of the bi-directional overrunning clutch of FIG. 8.

As best seen in FIG. 9, the inner cam surface 112 includes tapered portions $113_T$ that correspond to the forward and reverse engagement positions as described above with respect to the prior embodiment. The cam surface 112 provides for forward and reverse driving of the primary drive axle, while permitting overrunning of individual the shaft segments.

The wave springs 150 operate as friction members or frictional interconnects for controlling the relative rotation between the roll cage 118 and the clutch housing 108 in a similar manner to the friction forces provided by the O-rings 72 of clutch 30. The operation of the wave springs 150 in clutch 100 differs slightly from that of the O-rings 72 in clutch 30 in the following manner. As previously described, the O-rings 72 are compressed between the hubs 54 and the covers 60 that are secured to the roll cage 42. The friction caused by the O-rings 72 connects the roll cage 42 to the ground (through the hubs) providing for the shifting of the roll cage 42 with respect to the clutch housing 32. In the embodiment shown in FIGS. 8–11, the wave spring 150 frictionally connect the roll cage 118 with the inner race of the bearings 134 which, in turn, is engaged with the hub 124. As a result, the friction produced by the wave springs 150 causes the roll cage 114 to rotate in combination with the hubs 124 during normal drive.

Overrunning of the rollers 116 occurs when a hub 124 rotates faster than the clutch housing 108. As described above, when this occurs, the rollers 116 are prevented from wedging between the clutch housing 108 and the hub 124. The rotation of the hub 124 overcomes the friction between the wave spring 150 and the roll cage 118, permitting the hub 124 to rotate faster than the clutch housing 124 which prevents engagement. The arrangement of the clutch shown in the figures permits each hub 124 and associated shaft segment to independently overrun in an identical manner to the overrunning of the bi-directional clutch in FIGS. 2–7. Similarly, the present embodiment can also provide backdrive when the vehicle is descending a slope. As in the previous embodiment, as the wheels begin to spin faster than the relative speed of the input gear (i.e., the hubs 124 begin to rotate faster than the clutch housing 108), the roll cage 118 will move, positioning the rollers 116 so that they wedge with the tapered portions of the cam surface 137 in the reverse-engagement position. This causes the hubs to engage with the clutch housing 108 and slows the wheels down to the speed of the clutch housing 108.

While the embodiments of the bi-directional overrunning clutch of the present invention shown in the figures are configured for use in a snowblower 10, the invention is not limited to such a device. On the contrary, the present invention can be used with many types of primary drive devices where overrunning of the primary shaft segments is necessary. The clutch of the present invention is also not limited to use with single-axle walk behind equipment, but may be used for controlling a driven axle on multiple axle machinery, as well as ridden vehicles such as a golf cart, for example.

Figure 12:
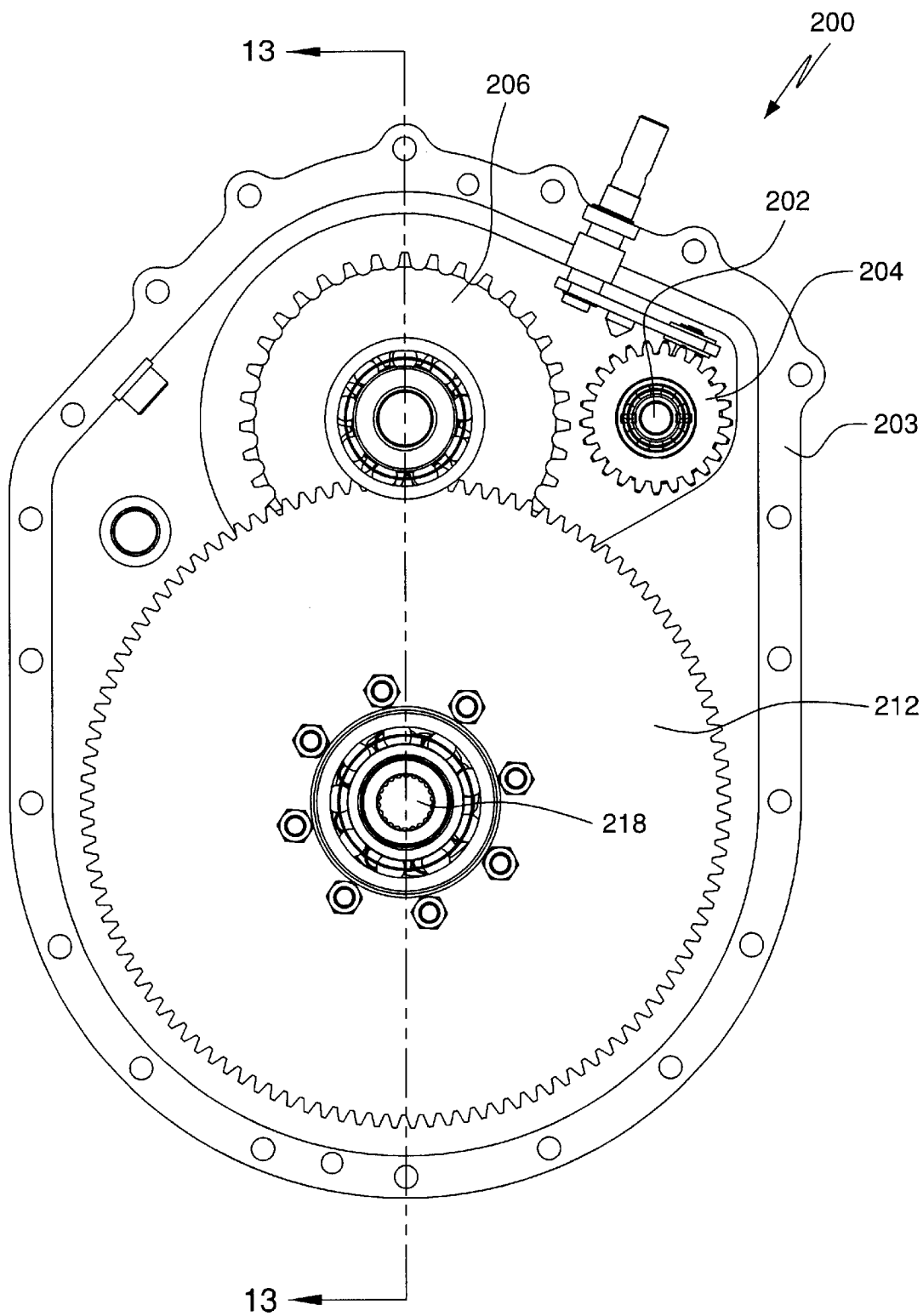
FIG. 12 is a front view of a transaxle which incorporates a bi-directional overrunning clutch according to the present invention.
Figure 13:
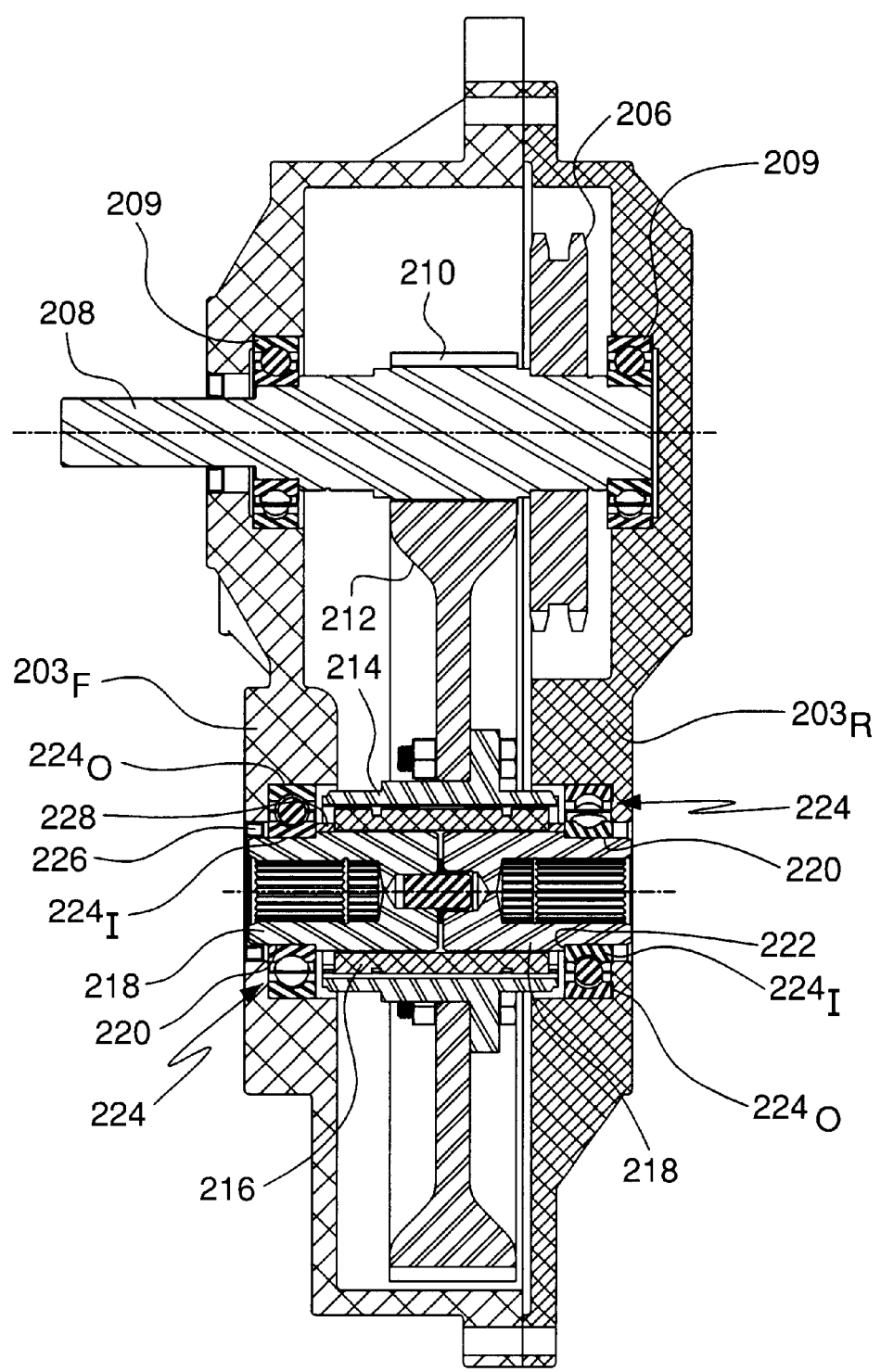
FIG. 13 is a section view of the transaxle of FIG. 12 illustrating the incorporation of the bi-directional between an intermediate shaft and two output hubs.

FIGS. 12 and 13 illustrate another embodiment 200 of the bi-directional overrunning clutch mounted within a transaxle. FIG. 12 is an illustration of the transaxle with the front cover removed to show the internal components. In this embodiment, an input shaft 202 extends into the housing 203, which is formed by front and back cover plates $203_F$ and $203_R$. An input pinion drive 204 is mounted on an end of the input shaft within the housing 203. The input pinion drive 204 is preferably a gear or sprocket which is adapted to engage with an intermediate drive 206 for providing torque transmission between the input shaft 202 and an intermediate shaft 208. The engagement between the input pinion drive 204 and the intermediate drive 206 can be through any conventional drive arrangement, such as with a chain drive, through gear meshing, or with a combination of the two. The illustrated transaxle uses a chain drive that provides drive in one direction (e.g., forward) and gear meshing in the other (e.g., rear).

The intermediate shaft 208 is mounted between bearings 209 so as to be rotatable within the housing 203. The intermediate shaft 208 has splines or teeth 210 formed around the circumference of a portion of the shaft which mate with a drive gear 212. The drive gear 212 is mounted to a clutch housing 214. Accordingly, the drive gear 212 is the input drive for the clutch housing 214. In the illustrated embodiment, the drive gear 212 is bolted to a flange on the clutch housing 214. However, other forms of attachment or mounting are contemplated. For example, the drive gear 212 can be formed as an integral extension of the clutch housing 214 similar to the combination shown in FIG. 3. Although not shown in the figures, the clutch housing has an internal cam surface similar to the cam surfaces shown in FIGS. 7 and 9.

A roll cage 216 is located within the clutch housing 214, radially inward from the cam surface. The construction of the roll cage is similar to the construction of the roll cages described above with respect to the previous embodiments, and, as such, the details are not necessary.

As shown in FIG. 13, hubs 218 are located radially inward from the roll cage 216. Each hub 218 includes a necked-down (reduced diameter) portion 220 located on an axially outward end of the hub. The transition to the necked-down portion forms a stop or lip 222 on the hub. A roller bearing 224 mounted between the necked-down portion 220 of each hub and the associated cover plate 203. The inner race $224_I$ of the bearing 224 is preferably mounted to the hub adjacent to the lip 222. The outer race $224_O$ of the bearing 224 is in contact with a portion of or recess in the cover plate 203. Preferably the outer race $224_O$ is press fit in or secured to the cover plate 203 so that the outer race does not move. The lip 222, bearing 224 and cover plate 203 are preferably arranged such that attachment of the cover plates $203_F$, $203_R$ to one another forces the inner race $224_I$ of each bearing 224 to contact or be located near the lip 222 on the hub, thus limiting or inhibiting axial motion of the hub 218. A seal or similar end cap 226 may be located between each hub 218 and its associated cover plate 203 on the outer end of the hub to minimize contaminants from entering into or oil from leaking out of the housing 203.

As discussed with respect to the previous embodiments, a friction member 228 is located between the roll cage 216 and the hubs. Preferably, there is one friction member 228 located between each axial end of the roll cage 216 and an associated hub 218. The friction member can be any suitable component which would provide sufficient friction between the roll cage 216 and the hub to cause the roll cage and hub to rotate in combination, yet would permit the hub to rotate independently from the roll cage when the speed of rotation of the roll cage 216 is different than the relative speed of rotation of the clutch housing 214. In one embodiment, the friction member is a rubber or similar elastomer element located between the face of the roll cage 216 and the inner race $224_I$ of the bearing 224. In another embodiment, the friction member is a spring, such as a wave spring located between the face of the roll cage 216 and the inner race $224_I$ of the bearing 224.

Although the present invention has been described and illustrated with respect to the exemplary embodiments thereof, it should be understood by those skilled in the art that the foregoing and various other changes, omissions and additions may be made therein and thereto, without parting form the spirit and scope of the present invention.

What is claimed is:

1. A bi-directional overrunning clutch for controlling torque transmission to shaft segments of a primary drive axle of a wheeled machine, the bi-directional overrunning clutch comprising:

an input gear adapted to be engaged with an input shaft for transmitting rotation of the input shaft into rotation of the input gear;

a clutch housing engaged to and adapted to be rotated by the input gear, the clutch housing having an inner cam surface on it;

a pair of hubs each adapted to engage an end of one of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot, the roll cage being located about at least a portion of the hubs so as to position each set of rollers about one of the hubs;

the roller assembly being located adjacent to the inner cam surface, the inner cam surface adapted to provide wedging engagement of the rollers between the inner cam surface and the hubs when the clutch housing is rotated in a first direction relative to the roll cage into a forward-engagement position and when the clutch housing is rotated in a second direction relative to the roll cage into a reverse-engagement position, the second direction of rotation being opposite the first; and at least one friction member in contact with the roll cage and the hub, the friction member causing the roll cage to rotate with the hubs relative to the clutch housing to engage the rollers between the inner cam surface and the hubs in the forward-engagement position, the friction member permitting at least one of the hubs to move relative to the roll cage when that hub is rotating faster than the clutch housing.

2. The bi-directional overrunning clutch according to claim 1 wherein the clutch housing is formed integral with the input gear.

3. The bi-directional overrunning clutch according to claim 2 wherein the input gear includes teeth that are formed about an outer circumference of the input gear and wherein the inner cam surface is formed on an inner diameter of the input gear.

4. The bi-directional overrunning clutch according to claim 1 wherein the hubs include splined ends for engaging with mating splined ends on the shaft segments.

5. The bi-directional overrunning clutch according to claim 1 wherein the clutch is mounted in a snowblower, the snowblower having a primary drive axle that includes two shaft segments, and wherein each shaft segment is drivingly engaged with one of the hubs, the snowblower including a motor with an output shaft that is engaged with the input gear for transmitting rotary motion to the input gear.

6. The bi-directional overrunning clutch of claim 1 further comprising at least one spring for biasing all the rollers in at least one common direction such that all the rollers in a set wedge with one of the hubs during at least one state of engagement of the clutch.

7. A bi-directional overrunning clutch for controlling torque transmission to shaft segments of a primary drive axle of a wheeled machine, the bi-directional overrunning clutch comprising:

an input gear adapted to be engaged with an input shaft for transmitting rotation of the input shaft into rotation of the input gear;

a clutch housing engaged to and adapted to be rotated by the input gear, the clutch housing having an inner cam surface on it;

a pair of hubs each adapted to engage an end of one of a shaft segment of a primary drive axle for rotation therewith;

a roller assembly disposed within the clutch housing, the roller assembly including a plurality of rollers arranged in two sets of rollers, each set being positioned around at least a portion of a one of the hubs, and a roll cage having a plurality of slots, each roller being located within a slot, the roll cage being located about at least a portion of the hubs;

the roller assembly being located adjacent to the inner cam surface, the inner cam surface adapted to provide wedging engagement of the rollers between the inner cam surface and the hubs when the clutch housing is rotated in a first direction relative to the roll cage into a forward-engagement position and when the clutch housing is rotated in a second direction relative to the roll cage into a reverse-engagement position, the second direction of rotation being opposite the first; and at least one friction member in contact with the roll cage and the hub, the friction member causing the roll cage to rotate with the hubs relative to the clutch housing to engage the rollers between the inner cam surface and the hubs in the forward-engagement position, the friction member permitting at least one of the hubs to move relative to the roll cage when that hub is rotating faster than the clutch housing a pair of covers each secured to an end of the roll cage for rotation therewith and wherein the friction member includes a pair of O-rings, each O-ring being compressed between one of the hubs and one of the covers for providing frictional contact between the hub and the roll cage.

8. The bi-directional overrunning clutch according to claim 7 further comprising a second O-ring positioned between each cover and a portion of the clutch housing.

9. The bi-directional overrunning clutch according to claim 7 further comprising a plurality of springs attached to the roll cage so that there are two springs associated with and located on opposite sides of each roller, the springs permitting the rollers to move relative to the roll cage and clutch housing such that all the rollers wedge with a hub at the same time.

10. A bi-directional overrunning clutch for controlling torque transmission to shaft segments of a primary drive axle of a wheeled machine, the bi-directional overrunning clutch comprising:

an input gear adapted to be engaged with an input shaft for transmitting rotation of the input shaft into rotation of the input gear;

a clutch housing engaged to and adapted to be rotated by the input gear, the clutch housing having an inner cam surface on it;

a pair of hubs each adapted to engage an end of one of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot, the roll cage being located about at least a portion of the hubs;

the roller assembly being located adjacent to the inner cam surface, the inner cam surface adapted to provide wedging engagement of the rollers between the inner cam surface and the hubs when the clutch housing is rotated in a first direction relative to the roll cage into a forward-engagement position and when the clutch housing is rotated in a second direction relative to the roll cage into a reverse-engagement position, the second direction of rotation being opposite the first;

at least one friction member in contact with the roll cage and the hub, the friction member causing the roll cage to rotate with the hubs relative to the clutch housing to engage the rollers between the inner cam surface and the hubs in the forward-engagement position, the friction member permitting at least one of the hubs to move relative to the roll cage when that hub is rotating faster than the clutch housing; and a bearing located about a portion of each hub, the bearing including an inner race engaged with the hub portion and adapted to rotate with it, and wherein the frictional member includes two wave springs, one located between the roll cage and the inner race of each bearing for providing friction between the roll cage and the hub.

11. The bi-directional overrunning clutch according to claim 10 further comprising a plurality of springs attached to the roll cage so that there are two springs associated with and located on opposite sides of each roller, the springs permitting the rollers to move relative to the roll cage and clutch housing such that all the rollers wedge with a hub at the same time.

12. A bi-directional overrunning clutch for controlling torque transmission to shaft segments of a primary drive axle of a wheeled machine, the bi-directional overrunning clutch comprising:

an input gear adapted to be engaged with an input shaft for transmitting rotation of the input shaft into rotation of the input gear;

a clutch housing engaged to and adapted to be rotated by the input gear, the clutch housing having an inner cam surface on it;

a pair of hubs each adapted to engage an end of one of a shaft segment of a primary drive axle for rotation therewith;

a roller assembly disposed within the clutch housing, the roller assembly including a plurality of rollers arranged in two sets of rollers, each set being positioned around at least a portion of a one of the hubs, and a roll cage having a plurality of slots, each roller being located within a slot, the roll cage being located about at least a portion of the hubs;

the roller assembly being located adjacent to the inner cam surface, the inner cam surface adapted to provide wedging engagement of the rollers between the inner cam surface and the hubs when the clutch housing is rotated in a first direction relative to the roll cage into a forward-engagement position and when the clutch housing is rotated in a second direction relative to the roll cage into a reverse-engagement position, the second direction of rotation being opposite the first; and at least one friction member in contact with the roll cage and the hub, the friction member causing the roll cage to rotate with the hubs relative to the clutch housing to engage the rollers between the inner cam surface and the hubs in the forward-engagement position, the friction member permitting at least one of the hubs to move relative to the roll cage when that hub is rotating faster than the clutch housing wherein the bi-directional overrunning clutch is located within a transaxle, the transaxle having an input shaft extending into a transaxle housing, an input pinion gear is mounted at an end of an input shaft within the housing, the input pinion engageable with an intermediate gear formed on an intermediate shaft, the intermediate shaft being rotatably mounted within the housing, the intermediate shaft having a second set of gear teeth on it; and wherein the input gear meshes with second set of teeth on the intermediate shaft.

13. The bi-directional overrunning clutch according to claim 12 further comprising a bearing located about a portion of each hub, the bearing including an inner race engaged with the hub portion and adapted to rotate with it, and an outer race engaged with the housing, and wherein there are two friction members, one located between each end of the roll cage and the inner race of each bearing for providing friction between the roll cage and the hub.

14. A bi-directional overrunning clutch for controlling torque transmission to shaft segments of a primary drive axle of a wheeled machine, the bi-directional overrunning clutch comprising:

an input gear;

a clutch housing engaged to and adapted to be rotated by the input gear, the clutch housing having an inner cam surface on it;

a pair of hubs each adapted to engage an end of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot, the slots being arranged in the roll cage such that each set of rollers is disposed about a portion of one of the hubs;

the roller assembly being located adjacent to the inner cam surface, the inner cam surface having a contour which tapers toward the hubs on either side of the rollers so as to form forward and reverse tapered portions, the tapered portions sized to permit the rollers to wedge between the tapered portions of the cam surface and one of the hubs, the wedging of the rollers between the inner cam surface and the hubs on one side occurring when the clutch housing is rotated in a first direction relative to the roll cage into a forward-engagement position and wedging on the other side when the clutch housing is rotated in a second direction relative to the roll cage into a reverse-engagement position, the second direction of rotation being opposite the first; and two friction members in contact with the two portions of the roll cage, the friction members causing the roll cage to rotate with the hubs relative to the clutch housing to engage the rollers between the inner cam surface and the hubs in the forward-engagement position, each friction member permitting one of the hubs to move relative to the roll cage when that hub is rotating faster than the clutch housing.

15. The bi-directional overrunning clutch according to claim 14 wherein the friction members are located on opposite ends of the roll cage, between the roll cage end and a portion of the hub.

16. The bi-directional overrunning clutch according to claim 14 wherein the clutch housing is formed integral with the input gear.

17. The bi-directional overrunning clutch according to claim 16 wherein the input gear includes teeth that are formed about an outer circumference of the input gear and wherein the inner cam surface is formed on an inner diameter of the input gear.

18. The bi-directional overrunning clutch according to claim 14 wherein the hubs include splined ends for engaging with mating splined ends on the shaft segments.

19. The bi-directional overrunning clutch according to claim 14 wherein the clutch is mounted in a snowblower, the snowblower having a primary drive axle that includes two shaft segments, and wherein each shaft segment is drivingly engaged with one of the hubs, the snowblower including a motor with an output shaft that is engaged with the input gear for transmitting rotary motion to the input gear.

20. The bi-directional overrunning clutch of claim 14 wherein the roll cage includes outer edges located on the axially opposite sides of the cage and wherein each friction member is located between one of the outer edges and a portion of one of the hubs.

21. The bi-directional overrunning clutch of claim 20 wherein the friction members are wave springs, each wave spring biasing the outer edge of the roll cage and the hub apart.

22. The bi-directional overrunning clutch of claim 20 wherein the outer edges of the roll cage are cover plates that are mounted to the roll cage.

23. A bi-directional overrunning clutch for controlling torque transmission to shaft segments of a primary drive axle of a wheeled machine, the bi-directional overrunning clutch comprising:

an input gear;

a clutch housing engaged to and adapted to be rotated by the input gear, the clutch housing having an inner cam surface on it;

a pair of hubs each adapted to engage an end of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot;

the roller assembly being located adjacent to the inner cam surface, the inner cam surface having a contour which tapers toward the hubs on either side of the rollers so as to form forward and reverse tapered portions, the tapered portions sized to permit the rollers to wedge between the tapered portions of the cam surface and one of the hubs, the wedging of the rollers between the inner cam surface and the hubs on one side occurring when the clutch housing is rotated in a first direction relative to the roll cage into a forward-engagement position and wedging on the other side when the clutch housing is rotated in a second direction relative to the roll cage into a reverse-engagement position, the second direction of rotation being opposite the first;

two friction members in contact with the two portions of the roll cage, the friction members causing the roll cage to rotate with the hubs relative to the clutch housing to engage the rollers between the inner cam surface and the hubs in the forward-engagement position, each friction member permitting one of the hubs to move relative to the roll cage when that hub is rotating faster than the clutch housing;

wherein the friction members are located on opposite ends of the roll cage, between the roll cage end and a portion of the hub; and a pair of covers each secured to an end of the roll cage for rotation therewith and wherein the friction members are O-rings, one O-ring compressed between each hub and a cover for providing frictional contact between the hub and the roll cage.

24. The bi-directional overrunning clutch according to claim 23 further comprising a second O-ring positioned between each cover and a portion of the clutch housing.

25. The bi-directional overrunning clutch according to claim 23 further comprising a plurality of springs attached to the roll cage so that there are two springs associated with and located on opposite sides of each roller, the springs permitting the rollers to move relative to the roll cage and clutch housing such that all the rollers wedge with a hub at the same time.

26. A bi-directional overrunning clutch for controlling torque transmission to shaft segments of a primary drive axle of a wheeled machine, the bi-directional overrunning clutch comprising:

an input gear;

a clutch housing engaged to and adapted to be rotated by the input gear, the clutch housing having an inner cam surface on it;

a pair of hubs each adapted to engage an end of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot;

the roller assembly being located adjacent to the inner cam surface, the inner cam surface having a contour which tapers toward the hubs on either side of the rollers so as to form forward and reverse tapered portions, the tapered portions sized to permit the rollers to wedge between the tapered portions of the cam surface and one of the hubs, the wedging of the rollers between the inner cam surface and the hubs on one side occurring when the clutch housing is rotated in a first direction relative to the roll cage into a forward-engagement position and wedging on the other side when the clutch housing is rotated in a second direction relative to the roll cage into a reverse-engagement position, the second direction of rotation being opposite the first;

two friction members in contact with the two portions of the roll cage, the friction members causing the roll cage to rotate with the hubs relative to the clutch housing to engage the rollers between the inner cam surface and the hubs in the forward-engagement position, each friction member permitting one of the hubs to move relative to the roll cage when that hub is rotating faster than the clutch housing; and a bearing located about a portion of each hub, the bearing having an inner race engaged with the hub portion and adapted to rotate with it, and wherein the frictional members include wave springs, one located between the roll cage and the inner race of each bearing for providing friction between the roll cage and the hub.

27. The bi-directional overrunning clutch according to claim 26 further comprising a plurality of springs attached to the roll cage so that there are two springs associated with and located on opposite sides of each roller, the springs permitting the rollers to move relative to the roll cage and clutch housing such that all the rollers wedge with a hub at the same time.

28. A bi-directional overrunning clutch for controlling torque transmission to shaft segments of a primary drive axle of a wheeled machine, the bi-directional overrunning clutch comprising:

an input gear;

a clutch housing engaged to and adapted to be rotated by the input gear, the clutch housing having an inner cam surface on it;

a pair of hubs each adapted to engage an end of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot; the roller assembly being located adjacent to the inner cam surface, the inner cam surface having a contour which tapers toward the hubs on either side of the rollers so as to form forward and reverse tapered portions, the tapered portions sized to permit the rollers to wedge between the tapered portions of the cam surface and one of the hubs, the wedging of the rollers between the inner cam surface and the hubs on one side occurring when the clutch housing is rotated in a first direction relative to the roll cage into a forward-engagement position and wedging on the other side when the clutch housing is rotated in a second direction relative to the roll cage into a reverse-engagement position, the second direction of rotation being opposite the first; and two friction members in contact with the two portions of the roll cage, the friction members causing the roll cage to rotate with the hubs relative to the clutch housing to engage the rollers between the inner cam surface and the hubs in the forward-engagement position, each friction member permitting one of the hubs to move relative to the roll cage when that hub is rotating faster than the clutch housing;

wherein the bi-directional overrunning clutch is located within a transaxle, the transaxle having an input shaft extending into a transaxle housing, an input pinion gear is mounted at an end of an input shaft within the housing, the input pinion engageable with an intermediate gear formed on an intermediate shaft, the intermediate shaft being rotatably mounted within the housing, the intermediate shaft having a second set of gear teeth on it; and wherein the input gear meshes with second set of teeth on the intermediate shaft.

29. The bi-directional overrunning clutch according to claim 28 further comprising a bearing located about a portion of each hub, the bearing including an inner race engaged with the hub portion and adapted to rotate with it, and an outer race engaged with the housing, and wherein one friction member is located between each end of the roll cage and the inner race of each bearing for providing friction between the roll cage and the hub.

30. A transaxle on a primary drive axle of a wheeled machine, the transaxle comprising:

a housing with front and back covers attached to one another;

an input shaft extending into the housing, the input shaft having an input pinion drive mounted at an end of the input shaft located within the housing;

an intermediate shaft rotatably mounted within the housing, the intermediate shaft having an intermediate drive formed on it which is adapted to be engaged with the input pinion drive for transmitting rotary motion between the input shaft and the intermediate shaft, the intermediate shaft having a set of output drive teeth;

an input gear having gear teeth which mate with the output drive teeth for transmitting rotary motion between the input gear and the intermediate shaft;

a clutch housing engaged to and adapted to be rotated by the input gear, the clutch housing having an inner cam surface on it;

a pair of hubs each adapted to engage an end of a shaft segment of a primary drive axle for rotation therewith;

a roller assembly disposed within the clutch housing, the roller assembly including a plurality of rollers arranged in two sets of rollers, each set being positioned around at least a portion of one of the hubs, and a roll cage having a plurality of slots, each roller being located within a slot the slots being arranged in the roll cage such that each of set of rollers is disposed about a portion of one of the hubs;

the roller assembly being located adjacent to the inner cam surface, the inner cam surface having a contour which tapers toward the hubs on either side of the rollers so as to form forward and reverse tapered portions, the tapered portions sized to permit the rollers to wedge between the tapered portions of the cam surface and the hub, the wedging of the rollers between the inner cam surface and the hubs on one side occurring when the clutch housing is rotated in a first direction relative to the roll cage into a forward-engagement position and wedging on the other side when the clutch housing is rotated in a second direction relative to the roll cage into a reverse-engagement position, the second direction of rotation being opposite the first;

a bearing located about a portion of each hub, the bearing including an inner race engaged with the hub portion and adapted to rotate with it, and an outer race engaged with the housing; and at least one friction member located between each end of the roll cage and the inner race of each bearing, the friction members providing friction between the roll cage and the hubs to cause the roll cage to rotate with the hubs relative to the clutch housing to engage the rollers between the inner cam surface and the hubs in the forward-engagement position, each friction member permitting the hub to move relative to the roll cage when that hub is rotating faster than the clutch housing.

* * * * *